(12) United States Patent
Olafson et al.

(10) Patent No.: US 6,395,062 B2
(45) Date of Patent: May 28, 2002

(54) PROCESS FOR RECOVERY OF METALS FROM METAL-CONTAINING ORES

(75) Inventors: Stephen M. Olafson; G. Timothy Fisher; Michael J. Virnig, all of Tucson, AZ (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/767,083

(22) Filed: Jan. 22, 2001

Related U.S. Application Data

(60) Provisional application No. 60/183,408, filed on Feb. 18, 2000.

(51) Int. Cl.[7] ............................. C22B 3/08; C22B 3/30; C21B 15/00
(52) U.S. Cl. ............................................ 75/722; 75/744
(58) Field of Search .................................... 75/722, 744

(56) References Cited

U.S. PATENT DOCUMENTS

| 4,231,888 A | 11/1980 | Dalton |
| 4,582,689 A | 4/1986 | Kordosky |
| 4,957,714 A | 9/1990 | Olafson et al. |
| 6,177,055 B1 | 1/2001 | Virnig et al. |

*Primary Examiner*—Roy King
*Assistant Examiner*—Tima McGuthry-Banks
(74) *Attorney, Agent, or Firm*—John E. Drach; Henry E. Millson, Jr.

(57) ABSTRACT

Use of a mixture of a C9 alkylsalicylaldoxime and a ketoxime as an extractant in a water-immiscible organic solvent solution in a metal extraction circuit to enhance the transfer of iron values to a dilute acid wash solution when the metal loaded organic solvent/extractant solution is washed with the dilute acid wash solution.

31 Claims, No Drawings

US 6,395,062 B2

PROCESS FOR RECOVERY OF METALS FROM METAL-CONTAINING ORES

CROSS-REFERENCE TO RELATED APPLICATIONS

This application claims the benefit of copending provisional application Ser. No. 60/183,408, filed on Feb. 18, 2000, the entire contents of which are incorporated herein by reference.

FIELD OF THE INVENTION

This invention relates to processes for the recovery of metals from metal-containing ores in which the ore is treated with an aqueous acid leach solution.

BACKGROUND OF THE INVENTION

In the recovery of metal values from metal-containing ores using an acid leach solution and an organic solvent extractant containing at least one oxime to extract the metal values from the acid leach solution, the oxime in the organic solvent will often extract not only the desired metal values, but also metal values that are not wanted such as iron.

The iron values must be significantly lowered in the organic solvent solution prior to the use of an acid strip solution to strip the desired metal values from the organic solvent solution. Failure to decrease the iron values in the organic solvent solution will result in contamination of the electrolyte, containing the desired metal values, such as copper. When iron is transferred to the acid strip solution and then to the tankhouse where the metal values are recovered by electrolysis, the electrolyte solution in the tankhouse must be partially removed from time to time to reduce the iron level in the electrolyte solution. This also results in a loss of copper values as well as tankhouse additives and sulfuric acid from the electrolyte solution in the tankhouse.

One method for reducing iron values in the organic solvent solution is the washing, i.e. scrubbing, of the organic solvent solution with a weakly acidic aqueous sulfuric acid solution, which has been found to remove part of the iron values in the organic solvent solution containing the oxime.

SUMMARY OF THE INVENTION

This invention relates to the discovery that the use of a mixture of a C9 alkylsalicylaldoxime with a ketoxime as extractant in an organic solvent solution containing metal values results in a significantly enhanced transfer of iron values therefrom when scrubbed with a weakly acidic aqueous sulfuric acid solution when using short mixer retention times, compared to the use of other aldoxime/ketoxime mixtures such as a mixture of a C12 alkylsalicylaldoxime and a ketoxime.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

The process for recovering metal values, such as copper, from ores containing them using an acid leach solution typically comprises at least the following steps, which are given for copper ores but are equally valid for the extraction of other metals.

1. Aqueous acid leaching of the copper ore using a strong acid to form an aqueous acid leach solution containing copper ions and often relatively small quantities of other metal ions. The aqueous leach acid solution dissolves salts of copper and other metals, if present, as it trickles through the ore. The metal values are usually leached with aqueous sulfuric acid, producing a leach solution having a pH of 0.9 to 2.0.

2. The copper-pregnant aqueous acid leach solution is mixed in tanks with an oxime extraction reagent which is dissolved in a water-immiscible organic solvent, e.g., a kerosene or other hydrocarbons. The reagent includes the oxime extractant which forms a metal-extractant complex with the copper ions as well as ions of other metals. The step of forming the complex is called the extraction or loading stage of the solvent extraction process.

3. The outlet of the mixer tanks continuously feeds to a large settling tank, where the organic solvent (organic phase), now containing the copper-extractant complex in solution, is separated from the depleted aqueous acid leach solution (aqueous phase). This part of the process is called phase separation. Usually, the process of extraction is repeated through two or more mixer/settler stages, in order to more completely extract the copper.

4. After extraction, the depleted aqueous acid leach solution (raffinate) is either discharged or recirculated to the ore body for further leaching.

5. The loaded organic phase containing the dissolved copper-extractant complex is fed to another set of mixer tanks, where it is mixed with a dilute acid scrub or wash solution to remove some of the residual metals other than copper from the organic phase. The acid used is dilute sulfuric acid. One or more wash stages may accordingly be employed depending on the trace metals present, the amount of entrainment and the required purity of the final copper loaded stripping solution.

6. The washed loaded organic phase is then fed to another set of mixer tanks, where it is mixed with an aqueous strip solution of concentrated sulfuric acid. The highly acid strip solution breaks apart the copper-extractant complex and permits the purified and concentrated copper to pass to the strip aqueous phase. The process of breaking the copper-extractant complex is called the stripping stage, and the stripping operation is repeated through two or more mixer-settler stages to more completely strip the copper from the organic phase.

7. As in the extraction process described above (step 2 and 3), the mixture is fed to another settler tank for phase separation.

8. From the stripping settler tank, the regenerated stripped organic phase is recycled to the extraction mixers to begin extraction again, and the copper is recovered from the strip aqueous phase, customarily by feeding the strip aqueous phase to an electrowinning tankhouse, where the copper metal values are deposited on plates by a process of electrodeposition.

9. After obtaining the copper values from the aqueous solution, the solution known as spent electrolyte, is returned to the stripping mixers to begin stripping again.

In the above circuit, the oxime extractant often used is a C12 alkylsalicylaldoxime, optionally with a ketoxime, e.g. 5-dodecylsalicylaldoxime alone, or a mixture of the foregoing with 2-hydroxy-5-nonylacetophenone oxime.

It has now been discovered that when the oxime extractant is a C9 alkylsalicylaldoxime or a mixture thereof with a ketoxime, e.g. 5-nonylsalicylaldoxime and 2-hydroxy-5-nonylacetophenone oxime, the following advantages are obtained:

1. Highly effective iron removal is obtained compared to C12 alkylsalicylaldoxime and C12 alkylsalicylaldoxime/ketoxime mixtures, even when short retention (contact) times in the mixer tanks are used in scrub stage 5 above, e.g. retention times of from 1 to 5 minutes, preferably from 1 to 3 minutes, and more preferably from 1 to 2 minutes.

2. The C9 alkylsalicylaldoxime and the C9 alkylsalicylaldoxime/ketoxime mixture loads less iron in step 2, above than does a corresponding C12 alkylsalicylaldoxime and a mixture of a C12 alkylsalicylaldoxime and a ketoxime.

In step 5 above, the dilute aqueous sulfuric acid solution used in this step preferably contains from 7.5 to 40 g/l of sulfuric acid, more preferably from 7.5 to 25 g/l, and most preferably from 10 to 20 g/l. The dilute aqueous sulfuric acid solution is composed of either all fresh aqueous sulfuric acid or a mixture of fresh aqueous sulfuric acid and up to 99% by weight of aqueous sulfuric acid containing electrolyte i.e. spent electrolyte from step 9. above diluted with water as needed to provide the above sulfuric acid content. The volume:volume ratio of organic phase:dilute aqueous sulfuric acid phase used in the mixer in one or more wash stages is preferably from 0.1:1 to 4:1, more preferably from 0.5:1 to 3:1, and most preferably about 0.75:1.5.

The oxime extractant present in the organic phase used in the process of the invention is a C9 alkylsalicylaldoxime, optionally in a mixture with a ketoxime. When a ketoxime is present, the molar ratio of C9 alkysalicylaldoxime to ketoxime is preferably from 0.1:1 to 11:1, preferably from 0.4:1 to 3.5:1, and more preferably from 1:1 to 2.7:1. The oxime extractant is added to the organic solvent in step 2. above in a quantity sufficient to give a molar concentration of from 0.02 to 0.8.

The preferred C9 alkylsalicylaldoxime for use in the practice of the invention is 5-nonylsalicylaldoxime and the preferred ketoxime is 2-hydroxy-5-nonylacetophenone oxime. However, other C9 alkylsalicylaldoximes and ketoximes can be used that come within the scope of formula I below (provided that when A is hydrogen (i.e. a salicylaldoxime), R is a straight or branched chain C9 alkyl group and a=1):

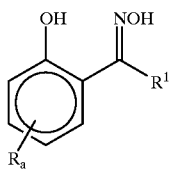

(I)

where R is a saturated aliphatic group of 1–25 carbon atoms, an ethylenically unsaturated aliphatic group of 3–25 carbon atoms, or OR" where R" is a saturated or ethylenically unsaturated aliphatic group as defined; a is 1,2,3, or 4; R' is hydrogen, a saturated aliphatic group of 1–25 carbon atoms, or an ethylenically unsaturated aliphatic group of 3 to 25 carbon atoms, with the proviso that the total number of carbon atoms in $R_a$ and R' is from 3–25.

Compounds of the hydroxy phenyl alkyl ketone oxime type can be prepared according to the procedures disclosed in UK Patent 1,322,532, and are especially preferred for use herein in admixture with C9 alkylsalicylaldoximes. The preferred compounds of this type are those having an isomeric mixture of 7 to 12 carbon alkyl groups as a single substituent on the ring para to the hydroxyl group. Also preferred are those in which the R' alkyl group is methyl.

Illustrative of such preferred compounds where R' is $CH_3$ is 2-hydroxy-5-nonylphenyl methyl ketone oxime manufactured through the use of commercial nonylphenol comprising a mixture of isomeric nonyl forms.

Hydroxy aryl aldoxime extractants which can be employed in mixtures with ketoximes are those in which R' is H. These hydroxy benzaldoximes, (also called "salicylaldoximes"), can be prepared according to methods described in Ackerley et al. U.S. Pat. Nos. 4,020,105 or 4,020,106 or by oximation of aldehydes prepared according to Beswick U.S. Pat. No. 4,085,146. As stated above, the aldoxime extractants used in the practice of the invention are salicylaldoximes of formula I in which the R group is a straight or branched chain C9 alkyl group and a=1, preferably 5-nonylsalicylaldoxime.

The oxime extractants used in the process of the invention can be used in conjunction with modifiers such as one or more equilibrium modifiers, and kinetic active substances. Equilibrium modifiers include long chain aliphatic alcohols such as n-hexanol, 2-ethylhexanol, isodecanol, dodecanol, tridecanol, hexadecanol, and octadecanol; long chain alkylphenols such as heptylphenol, octylphenol, nonylphenol and dodecylphenol; organophosphorus compounds such as tri-lower alkyl ($C_4$ to $C_8$) phosphates, especially, tributyl phosphate and tri(2-ethylhexyl)phosphate; and either saturated or unsaturated aliphatic or aromatic-aliphatic esters containing from 10 to 30 carbon atoms, ketones, nitrates, ethers, amides, carbamates, carbonates, and the like. Kinetic active substances include α,β-hydroxy oximes described in Swanson, U.S. Pat. No. 3,224,873 and α,β-dioximes described in Koenders et al., U.S. Pat. No. 4,173,616.

The water-immiscible organic solvents used in the solvent extraction process of the invention are usually water-immiscible liquid hydrocarbon solvents. These include aliphatic and aromatic hydrocarbon diluents such as kerosene, benzene, toluene, xylene and the like. A choice of essentially water-immiscible hydrocarbon solvents or mixtures thereof will depend on various factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are Chevron™ ion exchange solvent (available from Standard Oil of California) having a flash point of 195° Fahrenheit; Escaid™ 100 and 110 (available from Exxon-Europe) having a flash point of 180° Fahrenheit; Norpar™ 12 (available from Exxon-USA) with a flash point of 170° Fahrenheit; Conoco™ C1214 (available from Conoco) with a flash point of 160° Fahrenheit and C 170 exempt solvent having a flash point above 150° Fahrenheit; and Aromatic 150 (an aromatic kerosene available from Exxon-USA having a flash point of 150° Fahrenheit), and other various kerosene and petroleum fractions available from other oil companies, such as the ORFORM™ SX series of solvent extraction diluents (available from Phillips 66:SX 1, 7, 11, and 12 each having a flash point above 150° Fahrenheit varying up to 215° Fahrenheit); and ESCAID™ series of hydrocarbon diluents (available from Exxon; 100, 110, 115, 120, 200, and 300, each having a flash point above 150° Fahrenheit; and EXXOL™ D80 solvent (also available from Exxon and having a flash point above 150° Fahrenheit).

In the process, the volume ratios of organic to aqueous (O:A) phase in step 2. above will vary widely since the contacting of any quantity of the oxime organic solution with the copper containing aqueous solution will result in the extraction of copper values into the organic phase. For commercial practically however, the organic (O) to aqueous (A) phase ratios for extraction are preferably in the range of about 50:1 to 1:50. It is desirable to maintain an effective O:A ratio of about 1:1 in the mixer unit by recycle of one of the streams. In the stripping step (step 6), the organic:aqueous stripping medium phase will preferably be in the range of about 1:4 to 20:1. In washing step (5) the volume ratios of organic phase:dilute aqueous sulfuric acid phase will preferably be in the range of 5:1 to 80:1. For practical purposes, the extracting and stripping are normally conducted at ambient temperatures and pressure although higher and lower temperatures and pressures are entirely operable although higher temperatures will increase oxime degradation. While the entire operation can be carried out as a batch operation, most advantageously the process is carried out continuously with the various streams or solutions being recycled to the various operations in the process for recovery of the copper metal, including the leaching, extraction and the stripping steps.

After stripping of the copper values from the organic phase by the aqueous stripping solution and separation of the organic and aqueous stripping phase, the copper metal can be recovered by conventional recovery processes, including, but not limited to, precipitation and electrowinning. Electrowinning is typically the preferred means of recovery of the copper from solutions suitable for electrowinning, generally highly acidic aqueous solutions, such as a sulfuric acid solution containing greater than about 80 to about 200 g/l sulfuric acid, which is preferred as the aqueous acidic stripping solution to remove the copper values from the organic phase.

The invention will be illustrated but not limited by the following examples.

EXAMPLES

Example 1

81.1 g/l of a mixture of 5-nonylsalicylaldoxime and 2-hydroxy-5-nonylacetophenone oxime (2.5:1 wt/wt ratio) in kerosene containing 7.48 g/l of Cu ions and 23.8 mg/l of iron ions was washed with an aqueous wash solution of sulfuric acid (24 g/l sulfuric acid) in a kerosene aqueous solution volume ratio of 1:2 for a contact time of 1.5 minutes. After the wash, the kerosene phase contained only 5.0 mg/l of iron ions, i.e. 78.8% of the iron ions present in the kerosene phase were removed by the acid wash solution.

Example 2

The process of Example 1 was repeated except that the kerosene phase contained 82.5 g/l of the oxime, 7.6 g/l of Cu ions and 27.0 mg/l of iron ions, and the aqueous wash solution contained 15 g/l of sulfuric acid. After the wash, the kerosene phase contained only 10.3 mg/l of iron ions, i.e. 61.9% of the iron ions present in the kerosene phase were removed by the acid wash solution.

Example 3

The process of Example 1 was repeated except that the kerosene phase contained 67.6 g/l of a mixture of 5-nonylsalicylaldoxime and 2-hydroxy-5-nonylacetophenone oxime (0.92:1 wt/wt ratio), 6.04 g/l of Cu ions, and 16.5 mg/l of iron ions. Also the wash had a contact time of 2 minutes. After the wash, the kerosene phase contained 5.9 mg/l of iron ions, i.e. 64.3% of the iron ions present in the kerosene phase were removed by the acid wash solution.

Comparative Example 1

The process of Example 1 was repeated, except that the kerosene phase contained 84.8 g/l of a mixture of 5-dodecylsalicylaldoxime and 2-hydroxy-5-nonylacetophenone, (2.9:1 wt/wt ratio), 6.8 g/l of Cu ions, and 32.8 mg/l of iron ions. After the wash, the kerosene phase contained 16.0 mg/l of iron ions, i.e. only 51.2% of the iron ions present in the kerosene phase were removed by the acid wash solution.

Comparative Example 2

The process of Comparative Example 1 was repeated except that the kerosene phase contained 86.3 g/l of the oxime mixture, 6.9 g/l of Cu ions, 35.6 mg/l of iron ions, and the wash solution contained 15 g/l of sulfuric acid. After the wash, the kerosene phase contained 21.7 mg/l of iron ions, i.e. only 39% of the iron ions present in the kerosene phase were removed by the acid wash solution.

Comparative Example 3

The process of Comparative Example 1 was repeated except that the kerosene phase contained 76.2 g/l of the oxime mixture, 6.2 g/l of Cu ions, and 23.0 mg/l of iron ions. Also, the contact time was 2 minutes. After the wash, the kerosene phase contained 10.9 mg/l of iron ions, i.e. only 52.6% of the iron ions present in the kerosene phase were removed by the acid wash solution.

Comparative Example 4

The process of Comparative Example 1 was repeated except that the kerosene phase contained 70.4 g/l of the oxime components in a 0.8:1 wt/wt ratio, with 5.8 g/l of Cu ions and 16.4 mg/l of iron ions. Also, the contact time was 2 minutes. After the wash, the kerosene phase contained 7.0 mg/l of iron ions i.e.57.3% of the iron ions present in the kerosene phase were removed by the acid wash solution.

Comparative Example 5

The process of Comparative Example 1 was repeated except that the kerosene phase contained 71.4 g/l of the oxime components, 5.9 g/l of Cu ions, and 13.8 mg/l of iron ions. After the wash, the kerosene phase contained 5.3 mg/l of iron ions, i.e. 61.6% of the iron ions present in the kerosene phase were removed by the acid wash solution.

What is claimed is:

1. In a process for the removal of iron values from a water-immiscible organic solvent containing an oxime extractant loaded with at least one other metal value by washing the organic solvent with a dilute aqueous sulfuric acid solution, the improvement wherein the oxime extractant is a C9 alkylsalicylaldoxime or a mixture of a C9 alkylsalicylaldoxime and a ketoxime, the contact time in a mixer between the organic solvent and the dilute aqueous sulfuric acid solution is from about 1 to about 5 minutes, and the dilute aqueous sulfuric acid solution contains from 0 to 99% by weight of a diluted electrolyte-containing aqueous sulfuric acid solution from a tankhouse.

2. The process of claim 1 wherein said contact time is from about 1 to about 3 minutes.

3. The process of claim 1 wherein when the oxime extractant is a mixture, the ketoxime has the formula

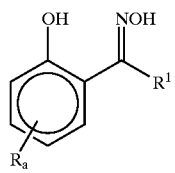

(I)

wherein R is a saturated aliphatic group of 1–25 carbon atoms, an ethylenically unsaturated aliphatic group of 3–25 carbon atoms, or OR" where R" is a saturated or ethylenically unsaturated aliphatic group as defined; a is 1,2,3, or 4; R' is a saturated aliphatic group of 1–25 carbon atoms, or an ethylenically unsaturated aliphatic group of 3 to 25 carbon atoms, with the proviso that the total number of carbon atoms in $R_a$ and R' is from 3 to 25.

4. The process of claim 3 wherein in formula I, a is 1, R is a straight or branched chain alkyl group having from 7 to 12 carbon atoms and R is attached in a position para to the hydroxyl group.

5. The process of claim 1 wherein the C9 alkylsalicylaldoxime is 5-nonylsalicylaldoxime.

6. The process of claim 5 wherein the ketoxime is 2-hydroxy-5-nonylacetophenone oxime.

7. The process of claim 1 wherein the dilute aqueous sulfuric acid solution contains about 7.5 to about 40 g/l of sulfuric acid.

8. The process of claim 7 wherein the dilute aqueous sulfuric acid solution contains from about 7.5 to about 25 g/l of sulfuric acid.

9. The process of claim 1 wherein the dilute aqueous sulfuric acid solution contains from about 10 to about 20 g/l of sulfuric acid.

10. The process of claim 1 wherein the volume:volume ratio of organic solvent:dilute aqueous sulfuric acid solution in the mixer is from about 0.1:1 to about 4:1.

11. The process of claim 1 wherein the at least one other metal value comprises copper values.

12. The process of claim 1 wherein the oxime extractant is present in the organic solvent in a quantity sufficient to provide from about 0.02 to about 0.8 molar concentration.

13. The process of claim 1 wherein the mixture of a C9 alkylsalicylaldoxime and ketoxime has a molar ratio of aldoxime to ketoxime of from about 0.1:1 to about 11:1.

14. The process of claim 13 wherein the mixture of a C9 alkylsalicylaldoxime and ketoxime has a molar ratio of aldoxime to ketoxime of from about 0.4:1 to about 3.5:1.

15. The process of claim 13 wherein said molar ratio is from about 1:1 to about 2.7:1.

16. The process of claim 1 wherein the oxime extractant is a mixture of 5-nonylsalicylaldoxime and 2-hydroxy-5-nonylacetophenone oxime, the contact time is from about 1 to about 3 minutes, and the molar ratio of aldoxime to ketoxime is from about 0.1:1 to about 11:1.

17. A process for the recovery of copper from a copper ore comprising the steps of:
A) leaching the copper ore with a strong acid to form an aqueous acid leach solution having a pH of about 0.9 to about 2.0 containing copper ions and lesser quantities of other metal ions including iron ions;
B) contacting the aqueous acid leach solution with a water-immiscible organic solvent containing an extractant comprising a mixture of a C9 alkylsalicylaldoxime and a ketoxime to form a metal extractant complex;
C) separating the organic solvent containing the metal-extractant complex from the now metal ion depleted aqueous acid leach solution;
D) contacting the organic solvent containing the metal-extractant complex with a dilute aqueous sulfuric acid solution for a contact time in a mixer of from about 1 to about 5 minutes to remove iron values from the organic solvent phase, wherein the dilute aqueous sulfuric acid solution contains from 0 to 99% by weight of a diluted electrolyte-containing aqueous sulfuric acid solution from a tankhouse;
E) mixing the organic solvent phase with an aqueous strip solution of concentrated sulfuric acid to extract the copper values into the strip solution; and
F) recovering the copper values from the strip solution in a tankhouse.

18. The process of claim 17 wherein in step D) said contact time is from about 1 to about 3 minutes.

19. The process of claim 17 wherein when the oxime extractant is a mixture, the ketoxime has the formula

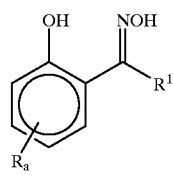

(I)

where R is a saturated aliphatic group of 1–25 carbon atoms, an ethylenically unsaturated aliphatic group of 3–25 carbon atoms, or OR" where R" is a saturated or ethylenically unsaturated aliphatic group as defined; a is 1, 2, 3, or 4; R' is a saturated aliphatic group of 1–25 carbon atoms, or an ethylenically unsaturated aliphatic group of 3 to 25 carbon atoms, with the proviso that the total number of carbon atoms in $R_a$ and R' is from 3–25.

20. The process of claim 19 wherein in formula I, a is 1, R is a straight or branched chain alkyl group having 7 to 12 carbon atoms and R is attached in a position para to the hydroxyl group.

21. The process of claim 17 wherein in step B) the C9 alkylsalicylaldoxime is 5-nonylsalicylaldoxime.

22. The process of claim 21 wherein the ketoxime is 2-hydroxy-5-nonylacetophenone oxime.

23. The process of claim 17 wherein in step D) the dilute aqueous sulfuric acid solution contains from about 7.5 to about 40 g/l of sulfuric acid.

24. The process of claim 23 wherein the dilute aqueous sulfuric acid solution contains from about 7.5 to about 25 g/l of sulfuric acid.

25. The process of claim 23 wherein the dilute aqueous sulfuric acid solution contains from about 10 to about 20 g/l of sulfuric acid.

26. The process of claim 17 wherein in step D) the volume:volume ratio of organic solvent:dilute aqueous sulfuric acid solution in the mixer is from about 0.1:1 to about 4:1.

27. The process of claim 17 wherein in step B) the extractant is present in the organic solvent in a quantity sufficient to provide from about 0.02 to about 0.8 molar concentration.

28. The process of claim 19 wherein in step B) the mixture of a C9 alkylsalicylaldoxime and ketoxime has a molar ratio of aldoxime to ketoxime of from about 0.1:1 to about 11:1.

29. The process of claim 28 wherein in step B) the mixture of a C9 alkylsalicylaldoxime and ketoxime has a molar ratio of aldoxime to ketoxime of from about 0.4:1 to about 3.5:1.

30. The process of claim 28 wherein said molar ratio is from about 1:1 to about 2.7:1.

31. The process of claim 17 wherein the oxime extractant is a mixture of 5-nonylsalicylaldoxime and 2-hydroxy-5-nonylacetophenone oxime, the contact time is from about 1 to about 3 minutes, and the molar ratio of aldoxime to ketoxime is from about 0.1:1 to about 11:1.

* * * * *